No. 784,512. Patented March 7, 1905.

UNITED STATES PATENT OFFICE.

NELS C. BILLE, OF BALFOUR, NORTH DAKOTA.

COMPOUND FOR EXTERMINATING GOPHERS.

SPECIFICATION forming part of Letters Patent No. 784,512, dated March 7, 1905.

Application filed September 22, 1904. Serial No. 225,509.

*To all whom it may concern:*

Be it known that I, NELS C. BILLE, a citizen of the United States, residing at Balfour, in the county of McHenry and State of North Dakota, have invented certain new and useful Improvements in Gopher-Exterminators; and I do declare the following to be a full, clear, and exact description of the invention, such as will enable others skilled in the art to which it appertains to make and use the same.

My invention is an improved compound for exterminating gophers and other noxious animals; and it consists of a compound of whisky, vinegar, water, strychnin, brown sugar, aniseed-oil, and alum, substantially as hereinafter described.

In the preparation of my improved exterminating compound I take of whisky one-half pint; vinegar, one and three-fourths quarts; water, one and three-fourths quarts; strychnin, three and one-half ounces; brown sugar, two pounds; aniseed-oil, one-fourth ounce, and alum one-fourth ounce.

The whisky, vinegar, water, and strychnin are mixed and boiled for about ten minutes. I then add the brown sugar, aniseed-oil, and alum, the same being stirred in and the mixture allowed to cool, when it is then bottled.

In using my compound I add to one pint of the compound enough boiling water to make one-half gallon. This is poured on a gallon of mixed oats and flaxseed while still hot and is thoroughly stirred in and kept in a closed vessel.

For use a small quantity of the poisoned grain is placed by the gopher-holes and in furrows. The same is very attractive to the animals and is very efficacious in destroying them.

I claim—

A compound for destroying gophers, consisting of whisky, vinegar, water, strychnin, sugar, aniseed-oil and alum, substantially in the proportions described.

In testimony whereof I have hereunto set my hand in presence of two subscribing witnesses.

NELS C. BILLE.

Witnesses:
D. T. OWENS,
FRED BEHNER.